United States Patent
Nakao et al.

(10) Patent No.: US 10,073,313 B2
(45) Date of Patent: *Sep. 11, 2018

(54) DISPLAY DEVICE AND MANUFACTURING METHOD THEREOF

(71) Applicant: Japan Display Inc., Tokyo (JP)

(72) Inventors: Kenji Nakao, Tokyo (JP); Osamu Itou, Tokyo (JP); Toshimasa Ishigaki, Tokyo (JP); Daisuke Sonoda, Tokyo (JP); Takato Hiratsuka, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/420,357

(22) Filed: Jan. 31, 2017

(65) Prior Publication Data

US 2017/0139299 A1    May 18, 2017

Related U.S. Application Data

(63) Continuation of application No. 14/790,857, filed on Jul. 2, 2015, now Pat. No. 9,594,278.

(30) Foreign Application Priority Data

Jul. 2, 2014 (JP) ................................ 2014-136800

(51) Int. Cl.
*G02F 1/1362* (2006.01)
*G02F 1/1339* (2006.01)
(Continued)

(52) U.S. Cl.
CPC ...... *G02F 1/136286* (2013.01); *G02F 1/1368* (2013.01); *G02F 1/13394* (2013.01);
(Continued)

(58) Field of Classification Search
CPC .. G02F 1/136; G02F 1/136286; G02F 1/1368; G02F 1/1335; G02F 1/133512;
(Continued)

(56) References Cited

U.S. PATENT DOCUMENTS 6,031,512 A    2/2000  Kadota et al.
9,201,276 B2   12/2015 Yang et al.
9,594,278 B2 *  3/2017 Nakao ................. G02F 1/13394

FOREIGN PATENT DOCUMENTS

JP    H08-179376 A    7/1996
JP    2001-350153 A   12/2001
(Continued)

OTHER PUBLICATIONS

Japanese Office Action dated Feb. 6, 2018 for corresponding Japanese Patent Application No. 2014-136800.

*Primary Examiner* — Thoi Duong
(74) *Attorney, Agent, or Firm* — TYPHA IP LLC (57) ABSTRACT

A provided is a liquid crystal display device with a high definition screen and less color mixture. On an array substrate, a pixel is formed between the adjacent video signal lines, a color filter is formed within the pixel, a flattening film is formed on the color filter, a lower layer is formed on the flattening film, and an upper layer having a slit is formed on the lower layer with an interlayer insulating film interposed therebetween; and on the array substrate, an opposite substrate is arranged with a liquid crystal layer interposed therebetween. When a distance from the top of the video signal line working as a light shielding film to the bottom of the liquid crystal layer is defined as d and a space between the centers of the video signal lines separating the pixel is defined as w, a relation of d≤0.3w is satisfied.

20 Claims, 12 Drawing Sheets

(51) Int. Cl.
*G02F 1/1343* (2006.01)
*G02F 1/1333* (2006.01)
*G02F 1/1368* (2006.01)
*G02F 1/1335* (2006.01)

(52) U.S. Cl.
CPC .... *G02F 1/13439* (2013.01); *G02F 1/133345* (2013.01); *G02F 1/133512* (2013.01); *G02F 1/133516* (2013.01); *G02F 1/134336* (2013.01); *G02F 1/134363* (2013.01); *G02F 1/136209* (2013.01); *G02F 1/136227* (2013.01); *G02F 2001/13398* (2013.01); *G02F 2001/133519* (2013.01); *G02F 2001/134372* (2013.01); *G02F 2001/136222* (2013.01); *G02F 2201/121* (2013.01); *G02F 2201/123* (2013.01)

(58) Field of Classification Search
CPC ......... G02F 1/134309; G02F 1/133345; G02F 1/134363; G02F 1/136209; G02F 1/136227; G02F 1/133514; G02F 1/133707; G02F 1/134336; G02F 1/133711; G02F 1/1362; G02F 1/1333; G02F 1/1343; G02F 2001/134372; G02F 2001/136222; G02F 2001/134318; G02F 2001/133357; G02F 2001/133519; H01L 27/3248; H01L 27/3262; H01L 27/3276; H01L 29/78669; G09G 2300/0426; G09G 3/3648
USPC ... 349/43, 106, 42, 110, 138, 143, 139, 141; 257/E33.062, E29.273
See application file for complete search history.

(56) References Cited

FOREIGN PATENT DOCUMENTS

| | | |
|---|---|---|
| JP | 2002-328385 A | 11/2002 |
| JP | 3738530 B2 | 1/2006 |
| JP | 2007-310885 A | 11/2007 |
| JP | 2009-276490 A | 11/2009 |
| JP | 2013-068949 A | 4/2013 |
| JP | 2013-142865 A | 7/2013 |

\* cited by examiner

DISPLAY DEVICE AND MANUFACTURING METHOD THEREOF

CLAIM OF PRIORITY

This application is a continuation of U.S. application Ser. No. 14/790,857, filed on Jul. 2, 2015. Further, this application claims priority from Japanese Patent Application No. 2014-136800 filed on Jul. 2, 2014, the contents of which are hereby incorporated by reference into this application.

BACKGROUND OF THE INVENTION (1) Field of the Invention

The invention relates to a display device, and more particularly to a liquid crystal display device of active matrix type.

(2) Description of the Related Art

A liquid crystal display device is generally an active matrix liquid crystal display device, including pixel transistors made of thin film transistors (Thin-Film-Transistor; hereinafter referred to as TFT) with respect to respective pixels formed in a matrix shape, which keeps display charge with the TFT pixel transistors in an OPEN state or in an electrically release state at any other time than the writing time.

Especially in these days, IPS element, particularly FFS element is widely used. This FFS device is formed by forming a flattening layer of resin on an array substrate, further superimposing an ITO layer, an insulating nitride film layer, and an ITO layer thereon.

A mobile phone is advanced to a smartphone, getting started to have the same function as a personal computer, with a remarkable increase of the display capacity expected. The screen size, however, cannot be formed so large; therefore, an extremely high display density is required.

The display density is represented by the display unit of ppi (pixel per inch: the number of pixels per inch) and as of the year 2013, the display unit of about 400 ppi is commercialized.

In our investigation, display resolution up to about 600 ppi can be assuredly recognized and finer definition is required. Even when clear dot recognition is not possible, it is said that a user requiring high quality requires high definition. Specifically, a high quality type of 700 ppi and 1000 ppi, exceeding 500 ppi, is required.

With advance to higher definition, there arises a problem such as a phenomenon of light leakage having a different color tone from the adjacent pixel. When a screen of a single color is displayed, "color mixture" with another color light mixed occurs disadvantageously. When the color mixture is seen in a front view, it is naturally improper, and when the color mixture is seen in left and right and oblique direction of a panel, it is also improper. It is an important point whether or not high yield and high accuracy can be achieved in the process of mass production.

In the conventional liquid crystal display device with a color filter formed on an opposite substrate, the primary cause of the color mixture is alignment deviation of an opposite substrate and an array substrate. In Japanese Patent No. 3738530, a technique of forming a color filter on the array substrate is disclosed in order to eliminate the effect of the alignment deviation of the array substrate and the opposite substrate with respect to the color mixture. The Japanese Patent No. 3738530 discloses a structure of forming a color filter on the array substrate in an island shape and easily forming a through-hole for conduction between electrodes on the array substrate.

SUMMARY OF THE INVENTION

The conventional general liquid crystal display device is formed by attaching together the array substrate with the TFT transistors formed and the opposite substrate with the color filter formed. The black matrix formed for optical separation between the pixels is formed on the side of the opposite substrate, and at the same time, video signal lines on the side of the array substrate also work as the black matrix in a sense of optical separation between the pixels.

The primary cause of the color mixture is the "alignment deviation of the opposite substrate" as a factor during the process. In the conventional production line, the alignment accuracy of the array substrate and the opposite substrate is 3 μm in the minimum deviation.

As a factor of design, the above cause is that a color filter of determining hue, a liquid crystal layer of determining ON-OFF of display, a black matrix of the color filter for separating the pixels, and video signal lines of the array substrate are separately formed in a thickness direction. In the FFS element, a flattening layer is about 2 μm thick, which is the maximum problem.

Figure 12:
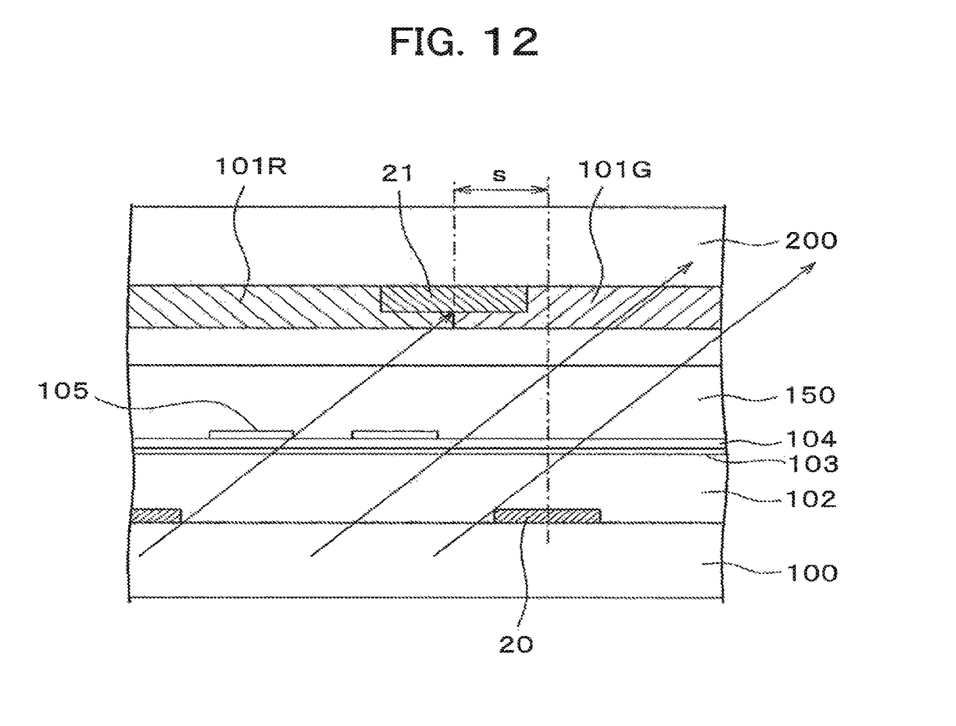
FIG. 12 is a cross-sectional view illustrating a problem of color mixture.

When the opposite substrate is deviated by 3 μm under the situation where a light shielding film of each layer is at a distance from each other in the thickness direction, the adjacent color comes into the relevant color in an oblique view, as illustrated in FIG. 12. This is the color mixture problem.

In FIG. 12, a video signal line 20 is formed on an array substrate 100 and a flattening film 102 is formed to cover the above. A lower layer ITO 104 is flatly formed on the flattening film 102 and further an upper layer ITO 105 is formed through the interlayer insulating film 104 there. The upper layer ITO 105 has a slit. In FIG. 12, a black matrix 21 and color filters 101R and 101G are formed on the opposite substrate 200. A liquid crystal layer 150 is interposed between the array substrate 100 and the opposite substrate 200.

In FIG. 12, the pixel boundary in the array substrate 100 is in the center of the video signal line 20 and the pixel boundary of the opposite substrate 200 is in the center of the black matrix 21. In FIG. 12, alignment of the array substrate 100 and the opposite substrate 200 is deviated by s. The value of s is 3 μm at the minimum. In FIG. 12, of the three arrows indicating the lights from the backlight on the side of the array substrate 100, two arrows at the right side cause the color mixture.

By arranging the color filter 101 on the side of the array substrate 100, effect of the color mixture caused by the alignment deviation of the array substrate 100 and the opposite substrate 200 can be eliminated; in a screen of higher definition, however, simple arrangement of the color filter 201 on the array substrate 100 does not become the perfect countermeasures against the color mixture. Specifically, in the fine definition of 500 ppi and more, the width of each pixel becomes 17 μm and less, and therefore, another factor than the alignment deviation of the array substrate 100 and the opposite substrate 200 is to affect the color mixture.

An object of the invention is to reduce the color mixture in a high definition screen with 500 ppi and more in the FFS method.

The invention is to solve the above mentioned problems and the concrete means are as follows.

(1) A liquid crystal display device with an array substrate on which scanning lines are respectively extended in a first direction and aligned in a second direction, video signal lines are respectively extended in the second direction and aligned in the first direction, pixels are respectively formed in areas surrounded by the scanning lines and the video signal lines, and an opposite substrate arranged in a way of facing the array substrate through a liquid crystal layer, wherein a color filter is formed on the pixel of the array substrate, an overcoat film is formed on the color filter, a lower layer ITO is formed on the overcoat film, an interlayer insulating film is formed to cover the lower layer ITO, an upper layer ITO with slit is formed on the interlayer insulating film, the video signal line is a light shielding film, and when a distance between the centers of the adjacent video signal lines separating the pixel in the first direction is defined as w and a distance from the top of the video signal line to the bottom of the liquid crystal layer is defined as d, an expression of d≤0.3w is satisfied.

(2) The liquid crystal display device according to the above (1), wherein a relation between the w and the d satisfies an expression of d≤0.15w.

(3) The liquid crystal display device according to either one of the above (1) or (2), wherein resolution of a display screen is 500 ppi and more.

(4) The liquid crystal display device according to either one of the above (1) or (2), wherein the overcoat film is formed of resin with the thickness in the range of 50% to 150% inclusive of the thickness of the color filter.

(5) The liquid crystal display device according to either one of the above (1) or (2), wherein the color filter and the video signal line working as a light shielding film are in contact with each other.

(6) The liquid crystal display device according to either one of the above (1) or (2), wherein the overcoat film is an inorganic film.

(7) The liquid crystal display device according to the above (6), wherein the overcoat film is formed of SiN or $SiO_2$.

(8) The liquid crystal display device according to either one of the above (1) or (2), wherein the color filter is formed on the pixel in an island shape.

(9) The liquid crystal display device according to either one of the above (1) or (2), wherein the upper layer ITO is a common electrode.

(10) The liquid crystal display device according to either one of the above (1) or (2), wherein the overcoat film is a positive resist.

(11) The liquid crystal display device according to either one of the above (1) or (2), wherein a black matrix is formed with thickness of 0.5 μm and more by being superimposed on the video signal line.

(12) The liquid crystal display device according to the above (11), wherein the black matrix has white light transmissivity of 30% and less.

(13) The liquid crystal display device according to the above (11), wherein the black matrix is formed in a multi-layer structure.

(14) The liquid crystal display device according to either one of the above (1) or (2), wherein in a plan view, a metal wiring for reducing resistance is superimposed on the video signal line and formed in the lower layer ITO or the upper layer ITO.

(15) The liquid crystal display device according to the above (11), wherein the black matrix is formed in a way of separating the color filter.

(16) The liquid crystal display device according to either one of the above (1) or (2), wherein a transparent spacer is superimposed on the video signal line and formed in a way of separating the color filter.

(17) The liquid crystal display device according to the above (16), wherein the thickness of the spacer is 3 μm and more.

(18) The liquid crystal display device according to the above (16), wherein the thickness of a portion of the liquid crystal layer corresponding to the spacer is ½ and less of the thickness of the liquid crystal layer in a pixel region.

(19) The liquid crystal display device according to the above (16), wherein the thickness of a portion of the liquid crystal layer corresponding to the spacer is ⅒ and less of the thickness of the liquid crystal layer in the pixel region.

(20) A liquid crystal display device with an array substrate on which scanning lines are respectively extended in a first direction and aligned in a second direction, video signal lines are respectively extended in the second direction and aligned in the first direction, pixels are respectively formed in areas surrounded by the scanning lines and the video signal lines, and an opposite substrate arranged in a way of facing the array substrate through a liquid crystal layer, wherein a color filter is formed on the pixel of the array substrate, a lower layer ITO is formed on the color filter, an interlayer insulating film is formed to cover the lower layer ITO, an upper layer ITO with slit is formed on the interlayer insulating film, the video signal line is a light shielding film, and when a distance between the centers of the adjacent video signal lines separating the pixel in the first direction is defined as w and a distance from an upper boundary of the video signal line to a lower boundary of the liquid crystal layer is defined as d, an expression of d≤0.3w is satisfied.

(21) The liquid crystal display device according to the above (20), wherein a relation between the w and the d satisfies an expression of d≤0.15w.

(22) The liquid crystal display device according to the above (20) or (21), wherein an ion deposition reducing material is used for the color filter.

(23) A method of manufacturing a liquid crystal display device with an array substrate on which scanning lines are respectively extended in a first direction and aligned in a second direction, video signal lines are respectively extended in the second direction and aligned in the first direction, pixels are respectively formed in areas surrounded by the scanning lines and the video signal lines, and an opposite substrate arranged in a way of facing the array substrate through a liquid crystal layer, comprising: forming a black matrix with a first thickness on the video signal line; applying a resist for color filter with a second thickness in away of covering the black matrix and a space between the adjacent black matrixes; forming the first thickness thicker than the second thickness; exposing the resist for color filter between the adjacent black matrixes with an exposure mask having a diameter smaller than the above space between the adjacent black matrixes; and then, forming a color filter through development.

It is possible to realize a liquid crystal display device with a high definition screen and less color mixture.

DETAILED DESCRIPTION OF THE PREFERRED EMBODIMENTS

Hereinafter, forms of respective embodiments of the invention will be described with reference to the drawings. In order to make the description clearer, compared to the actual form, the width, thickness, and shape of each unit are schematically represented in some cases, they are only an example and not to restrict the interpretation of the invention. Further, in this specification and in each drawing, the same codes are attached to the same elements having been already described and their description is properly omitted.

Figure 2:
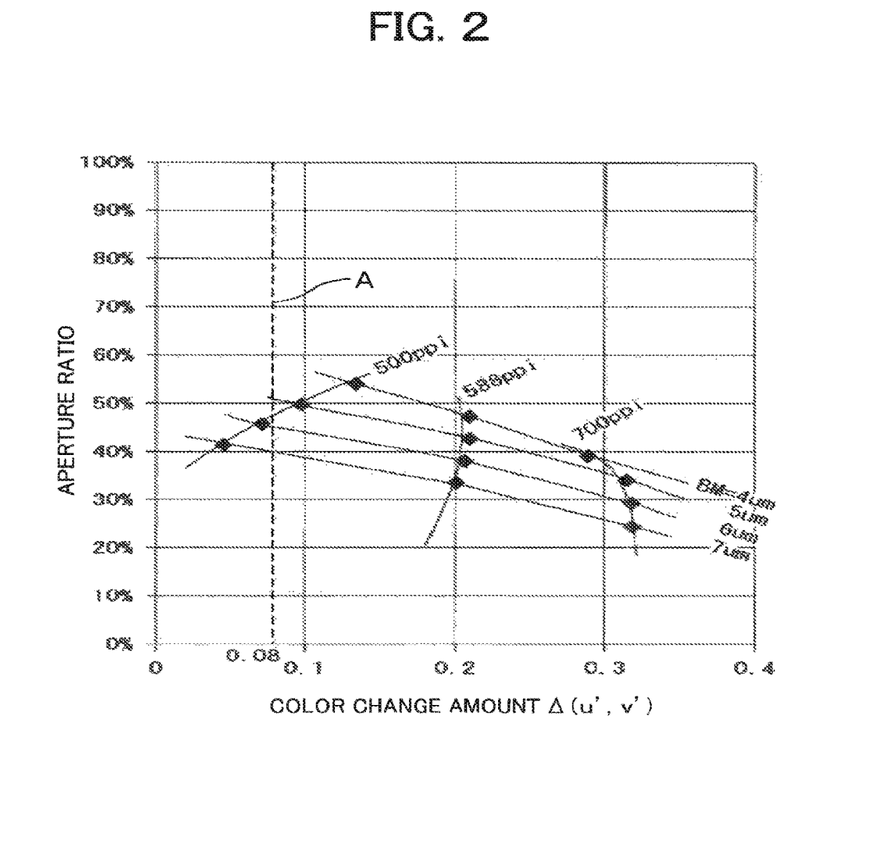
FIG. 2 is a graph showing a relation between color change amount and aperture ratio of a pixel according to the conventional example.

FIG. 2 is a simulation result of the color mixture when a color filter is used for an opposite substrate and a graph indicating a relation between the aperture ratio of a pixel and the color change amount. In FIG. 2, BM means width of black matrix. The alignment accuracy of the opposite substrate is getting better year by year; however, it is still difficult to make the error 3 µm and less and in this simulation, the case of the maximum deviation of 3 µm is assumed. Further, color mixture is determined with color change amount from the color in a front view to the color observed from a right and left direction at a slant of 45° used as an index in a horizontal axis. The condition where the value of Δu'v' indicating the color change amount is 0.08 and less is set as essential requirements. The vertical dotted line A in FIG. 2 is a line in the case where the color change amount is 0.08.

In order to suppress the color mixture, making the width of the black matrix thick is the most realistic design plan. This, however, decreases the aperture portion of a pixel unit, resulting in a decrease of brightness. Then, the value of the aperture ratio is used as a vertical axis, hence to determine the color mixture totally.

As illustrated in FIG. 2, when the resolution gets higher, the color change amount or the color mixture gets larger, and in a high definition screen of 500 ppi and more, the countermeasures against the color mixture is difficult in the method of forming a color filter on the opposite substrate. Hereinafter, by using embodiments, the contents of the invention capable of coping with the color mixture will be described in detail.

First Embodiment

Figure 1:
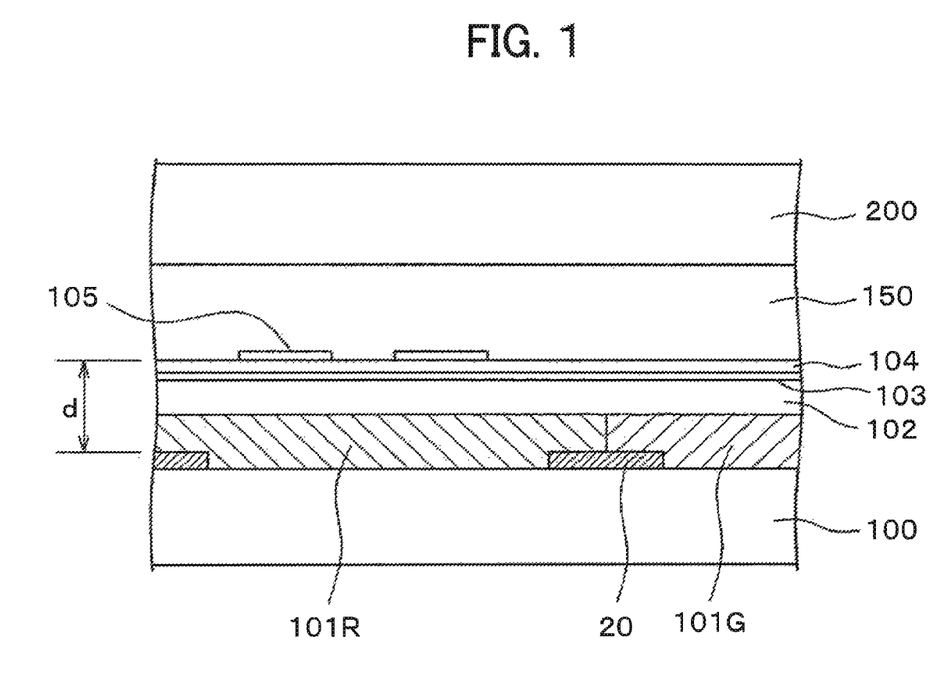
FIG. 1 is a cross-sectional view of a first embodiment of the invention.

In the invention, a Color Filter on Array (COA) method of forming a color filter on the side of an array substrate of a liquid crystal display device is adopted. FIG. 1 illustrates a cross sectional structure of a liquid crystal display device according to a first embodiment. As mentioned above, it is difficult for a high definition screen of 500 ppi and more to cope with the color mixture in a method of forming a color filter on an opposite substrate.

In FIG. 1, a video signal line 20 is arranged on an array substrate 100 and color filters 101R and 101G are formed thereon. A flattening film 102 is formed on the color filters 101R and 101G. The flattening film 102 is formed 2 µm thick of organic material such as acrylic resin. In the invention, however, as described later, the flattening film 102 can be occasionally formed of inorganic material such as SiN. In this case, since the word "flattening film" is not proper, it may be referred to as an overcoat film 102.

A lower layer ITO 103 is flatly formed on the flattening film 102. An interlayer insulating film 104 is formed on the lower layer ITO 103 in a covering way and an upper layer ITO 105 having comb-like electrodes is formed thereon. When a voltage is applied between the upper layer ITO 105 and the lower layer ITO 103, an electric line of force is generated from the upper layer ITO 105 through the liquid crystal layer 150 and this electric field rotates liquid crystal molecules to control the transmissivity of the liquid crystal layer for every pixel. An opposite substrate 200 is arranged on the liquid crystal layer 150 in a way of sandwiching the same between the both substrates.

The pixel boundary in the array substrate 100 is in the center of the video signal line 20. In FIG. 1, since neither black matrix nor color filter is formed on the opposite substrate 200, if the opposite substrate 200 is deviated from the TFT substrate 100, nothing affects on the color mixture.

In short, using the COA structure, the alignment accuracy is challenged by only the alignment deviation of the electrode layers formed on the array substrate 100 and the effect of thickness of the electrode or the insulating film. The deviation between the above layers during the TFT process can be controlled by a stepper, and therefore, by forming the color filter 101 on the TFT substrate 100, the alignment deviation can be decreased. In the COA, the deviation between the respective layers can be within ±1.5 µm.

Figure 3:
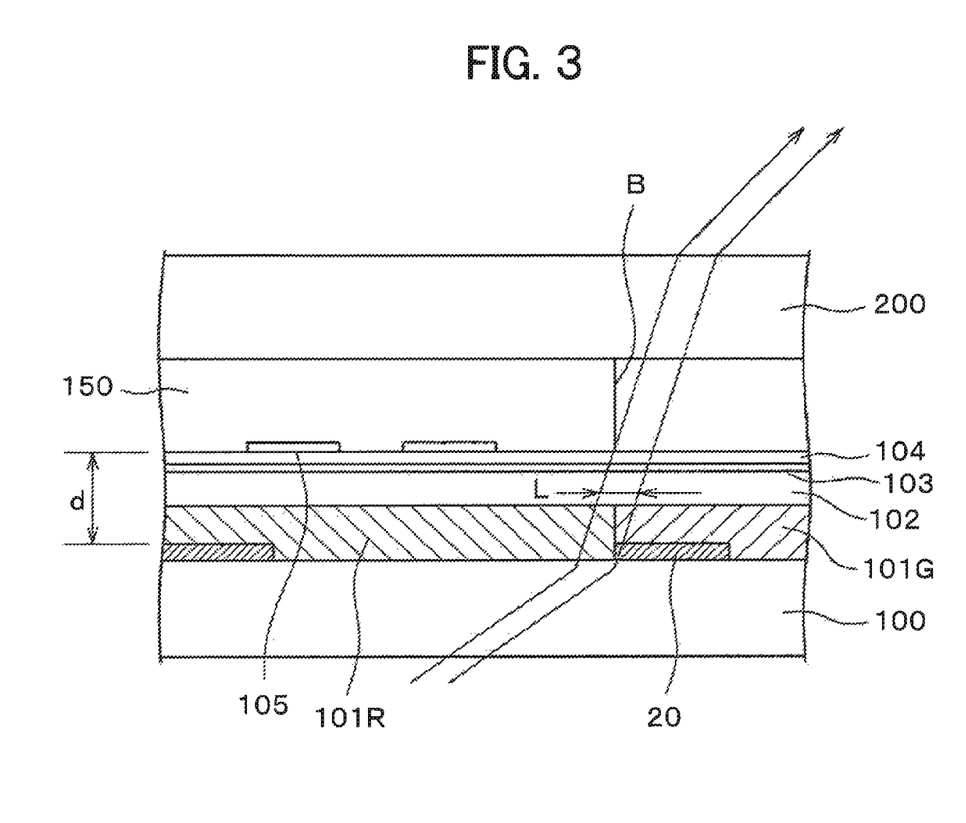
FIG. 3 is a view for use in describing the first embodiment.

FIG. 3 is a conceptual diagram for description. Assume that the width of the video signal line 20 working as a black matrix is defined as 3 µm and the deviation L of the boundary of the color filter 101R and the color filter 101G from the center of the video signal line 20 is defined as 1.5 µm. In this case, the color filter 101 never runs over the video signal line 20 as a light shielding film, with no color mixture in the front view. An oblique light, however, passes through the color filter 101 of the adjacent pixel, hence to generate the color mixture. Considering that the incident light to a panel is at a slant of 45°, an inside light beam path is at a slant of about 28°. The light beam path indicated by two arrows causes the color mixture.

In FIG. 3, a line B is a line corresponding to the boundary of the red color filter 101R and the blue color filter 101G in the liquid crystal layer 150. Assume that the red pixel is OFF and that the green pixel is ON. A part of the beam enters the red pixel and at the same time passes the green liquid crystal layer; as the result, red is mixed in the green screen. The light between the two arrows can be the color mixture. The right arrow indicates a light passing the edge of the black matrix and the left arrow indicates a light passing the edge of the display pixel of the liquid crystal layer.

In this color mixture behavior, the thickness of each layer is important. Assuming that the distance from the top of the video signal line 20 working as the black matrix to the bottom of the liquid crystal layer 150 is defined as d, the light amount (space between the two arrows) affecting the color mixture is L=0.53d. Assuming that the thickness of the overcoat film usually used is 2 μm and that the thickness of the color filter is about 3 μm, the distance from the black matrix 20 to the liquid crystal layer 150 is 5 μm and the length of L is 2.6 μm. The conventional width of the pixel is, for example, about 40 μm and this color mixture light amount does not matter so much.

With advance to higher definition as mentioned above, however, the pixel size becomes smaller. In the definition of 500 ppi, the size is about 17 μm and in this case, the color mixture amount L becomes a matter. This is because despite the total decrease of the pixel size, the color mixture amount does not change and therefore, the parameter becomes smaller. Accordingly, in a high definition panel, d has to be thin. In the usual thickness d=5 μm, the limit is the definition of 500 ppi and less; in about 600 ppi, the thickness has to be d=4 μm and less, and in 700 ppi, it has to be 2.5 μm and less. This relation is characterized in that the distance from the top of the video signal line 20 working as the black matrix to the bottom of the liquid crystal layer 150 is 0.3 times and less of the pixel size or the distance between the center lines of the video signal lines 20.

Also under this condition, however, the color change is about 0.08, acceptable although, but when the color change amount is desired to be smaller, it is preferable that d is further thinner. When the color change amount is defined as 0.02, it is preferable that the value of d is 2.6 μm and less in 500 ppi; 2 μm and less in 700 ppi; and 1.3 μm and less in 1000 ppi. This relation is characterized in that d is 0.15 times and less of the pixel size or the distance between the center lines of the video signal lines 20.

When d is too thin, however, the color purity is deteriorated disadvantageously. Even if using a so-called high color purity material, the color filter 101 cannot be 0.5 μm and less. Instead of the flattening film 102 formed of an organic film, when an inorganic material such as SiN is used as the overcoat film 102, d cannot be 0.5 μm and less. This area is illustrated as in FIG. 4.

Figure 4:
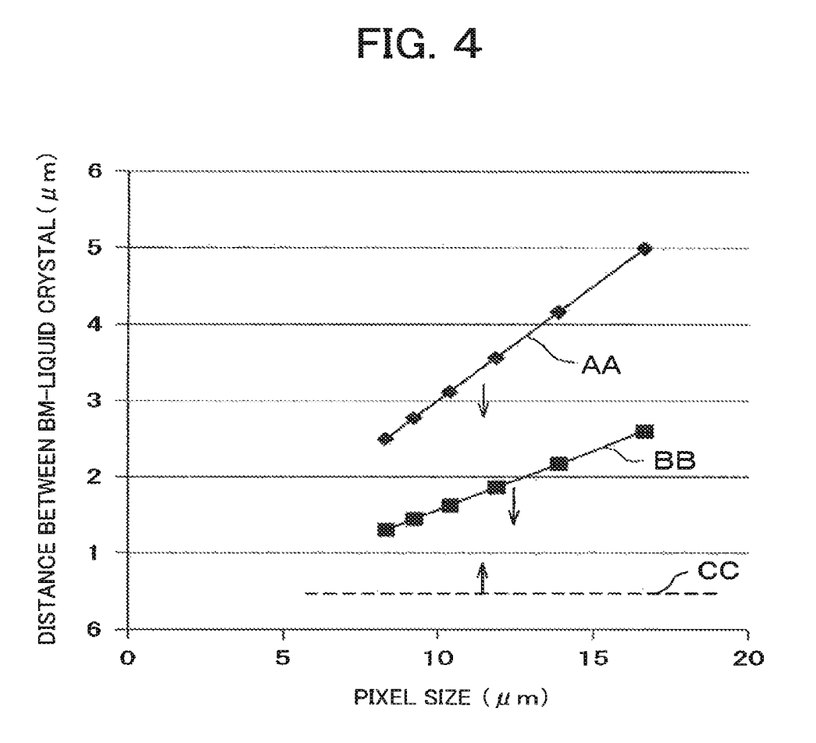
FIG. 4 is a graph showing the function of the first embodiment.

In FIG. 4, a direct line AA shows a relation between the pixel size or the distance between the center lines of the video signal lines and the distance d between the video signal line working as the black matrix and the liquid crystal layer in the case of the acceptable color change amount is 0.08 and a direct line BB shows the above in the case of the acceptable color change amount is 0.02. A dotted line CC shows the limit value, 0.5 μm of the distance d from the black matrix to the liquid crystal layer.

With respect to d, the thickness of the color filter and the thickness of the overcoat film are dominant and their balance is also an important factor. Although the overcoat film 102 made of photosensitive resin is used for the upper layer, when this is too thin, unevenness generated by the color filter 101 cannot be flattened completely. According to our investigation, in order to obtain the flattening effect, the thickness of the overcoat film 102 needs to be in the range of 50% to 150% inclusive of the thickness of the color filter 101. Thus, the overcoat film 102 formed of resin on the upper layer of the color filter 101 is used to get a predetermined thickness, hence to flatten the color filter 101; as the result, the FFS structure formed thereon can be properly formed without much defect.

The characteristic of the embodiment is to form a color filter as close as possible to the video signal line 20 formed on the array substrate 100 as a black matrix in a degree free from the optical color mixture and to set the distance from the top of the video signal line 20 as the black matrix to the bottom of the liquid crystal layer 150 not more than a predetermined distance, in order to decrease the color mixture. Here, although the color filter 101 may be separated from the black matrix 20 in the case of such a thickness as of an inorganic insulating film, the color filter 101 and the black matrix 20 are ideally in contact with each other.

Figure 5:
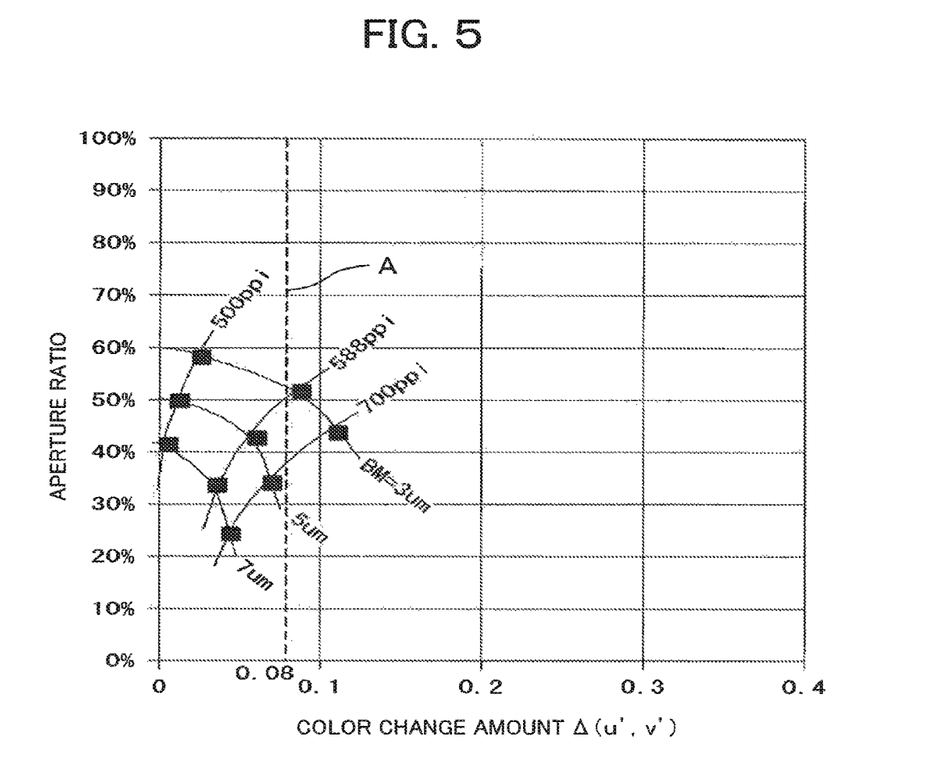
FIG. 5 is a graph showing a relation between the color change amount and the aperture ratio of a pixel according to the first embodiment.

FIG. 5 is a simulation result indicating a relation between the aperture ratio of a pixel and the color change amount in the structure of the embodiment. The horizontal axis of FIG. 5 indicates the color change amount and the vertical axis indicates the aperture ratio of a pixel. Further, BM in FIG. 5 means the width of the black matrix. A vertical line A indicated by the dotted line in FIG. 5 is a line with the color change amount of 0.08. In FIG. 5, calculation is made with d in FIG. 1 defined as 4 μm. Here, the part working as the black matrix is only the video signal line; in 500 ppi, even when the width of the black matrix (here, the video signal line) is 3 μm, a target value can be achieved and also in 700 ppi, when the width of the video signal line is set at 5 μm, the target value can be achieved. Here, the alignment deviation of each color filter and video signal line is defined as 1.5 μm.

In this case, the thickness from the color filter to the liquid crystal layer is defined as 4 μm; however, from a viewpoint of preventing the color mixture, the above both are preferably as close as possible to each other. In order to prevent the color mixture, ideally, there is no overcoat film or the overcoat film is preferably formed of an inorganic film into an extremely thin film. In the structure without the overcoat film, the FFS structure of directly forming a lower layer ITO layer just after forming a color filter is adopted. In this case, this structure is possible if ion deposition from a resin layer can be suppressed. In FIG. 1, the overcoat film for suppressing ion deposition from a color filter is formed. According to this, any particular color agent for suppressing the ion deposition does not have to be used.

In order to form the COA structure in high definition, there also exists another problem. Generally, the color filter 101 is formed by a negative resist; however, when photosensitive reaction is generated by a material including absorbent article like the color filter 101, there is such a problem that a light may be attenuated, to spoil the pattern accuracy. As the countermeasures, the color filter 101 is formed in an island shape, like the top plan view of FIG. 6. When forming a through-hole on the color filter 101, the diameter of the through-hole becomes too large in the negative resist having pigment, which makes the high definition photo process difficult; therefore, the color filter 101 is formed in an island shape, thereby eliminating the necessity of forming a through-hole in the color filter 101.

Figure 6:
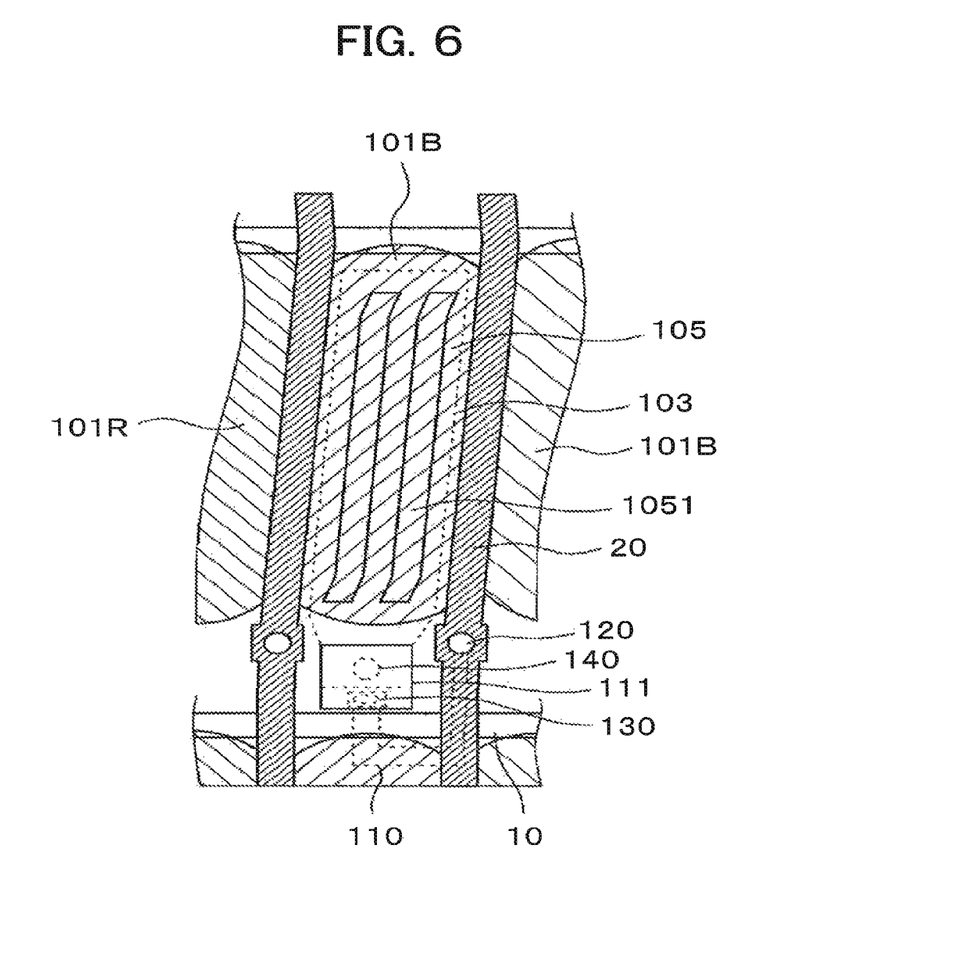
FIG. 6 is a top plan view of a pixel according to the first embodiment.

In FIG. 6, an area surrounded by the scanning line 10 and the video signal line 20 is a pixel. The semiconductor layer 110 is connected to the video signal line 20 through the first through-hole 120, extending under the video signal line 20 and then bending to be connected to the contact electrode 111 within the pixel through a second through-hole 130. During this process, the semiconductor layer 110 passes under the scanning line 10 twice, where TFT is formed.

In FIG. 6, the contact electrode 111 is connected to the pixel electrode through a third through-hole 140. In FIG. 6, the lower layer ITO 103 becomes a pixel electrode. A common electrode including a slit 1051 through the interlayer insulating film 104 is formed on the pixel electrode 103. In FIG. 6, the upper layer ITO 105 becomes the common electrode. The common electrode is formed in common with another pixel, except for the portion of the slit 1051.

In FIG. 6, the color filters 101R, 101G, and 101B are formed only in the areas corresponding to the respective pixel electrodes. The color filter is not formed in the portions of the through-holes 120, 130, and 140. Accordingly, there is no need to form the through-holes in the color filters 101R, 101G, and 101B, thereby enhancing the patterning accuracy.

In FIG. 6, the overcoat film is formed on the color filters 101R, 101G, and 101B, and in order to make the third through-hole 140 small, the FFS of the common electrode top structure is used. In many cases of FFS, the pixel electrode is formed in the upper layer; in this case, a larger through-hole has to be bored in the lower ITO electrode. The common top or when the pixel electrode is arranged in the lower layer, however, two layers of inorganic insulating films do not have to be formed in a double-hole structure and therefore, a common top structure is suitable for the high definition FFS. Also in this case, although a through-hole has to be formed in the overcoat film 102, the overcoat film 102 may be formed by a positive resist and high definition processing is possible because of including no pigment.

From a viewpoint of the process, the overcoat film 102 is preferably 0.5 µm thick and more considering the requirement as the flattening film, and most suitably 1 to 2.5 µm thick. This overcoat film 102 may be an inorganic film such as SiN and SiO; however, there is a limit of the inorganic film as the flattening film.

Second Embodiment

Only the formation of the color filter on the side of the TFT substrate cannot eliminate the color mixture completely. That is because there is a positional deviation between a color filter layer and another layer when forming the color filter layer and the color filter may occasionally protrude from the black matrix.

Figure 7:
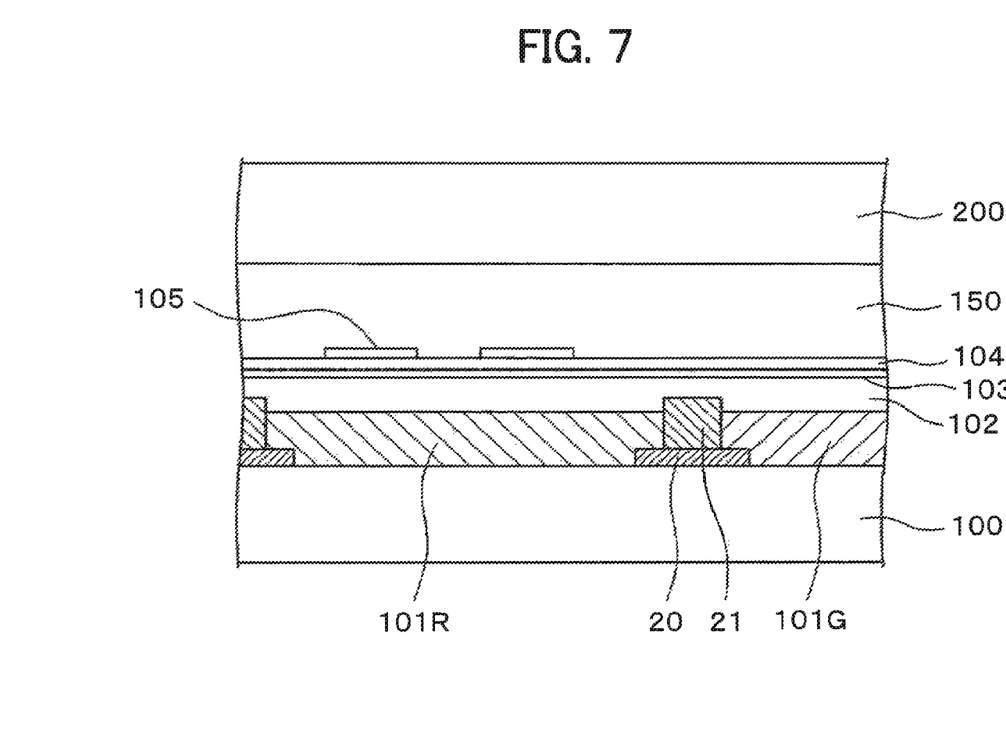
FIG. 7 is a cross-sectional view of a second embodiment.

Then, as illustrated in FIG. 7, a black matrix layer 21 is formed thick with resin on the video signal line 20. When the black matrix is thick, the distance from the black matrix 21 to the liquid crystal layer 150 can be decreased and the thickness is effective in decreasing the oblique light. In the embodiment, the black matrix 21 is formed by a black color resin resist with a thickness of 1 µm. The thickness is preferably 0.5 µm and more and according as the thickness is larger, the effect of the color mixture prevention is higher.

This embodiment is characterized by the black matrix 21 being thickened. The black matrix 21 is formed in a multi layer structure and the black matrix 21 effectively thick can be formed through the superimposition of the layers.

Figure 8:
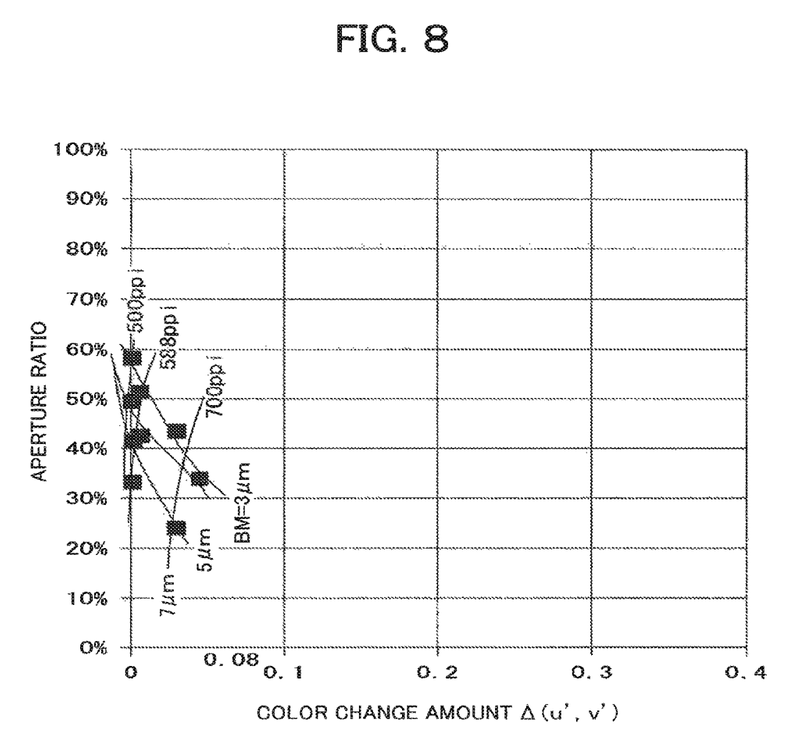
FIG. 8 is a graph showing a relation between the color change amount and the aperture ratio of a pixel according to the second embodiment.

A resist for black matrix is not restricted to black color as far as it is an absorbent article. When the transmissivity with respect to white color is 30% and less, a little grayish material is also effective. That is because when the absorption rate is high, evenness of width in the thickness direction cannot be kept disadvantageously when patterning according to the photolithography. FIG. 8 is a simulation result indicating a relation between the aperture ratio of a pixel and the color change amount in the structure of FIG. 7. As illustrated in FIG. 8, every structure estimated can satisfy the condition of the color change amount of 0.08 and less. Thus, according to the embodiment, a degree of the color mixture is much more improved than in the case of the first embodiment indicated in FIG. 5.

Figure 9A:
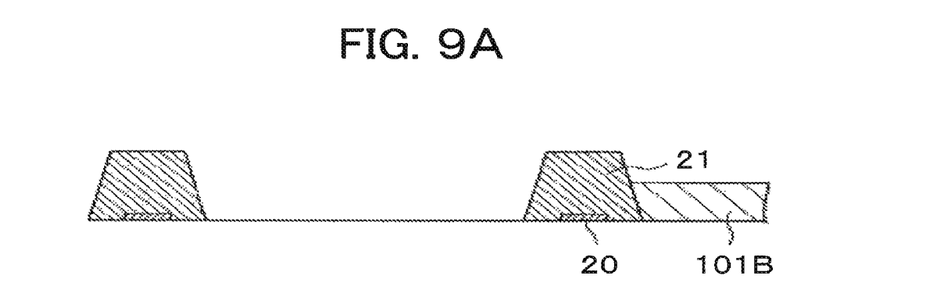
FIG. 9A is a process view where black matrix is formed.
Figure 9B:
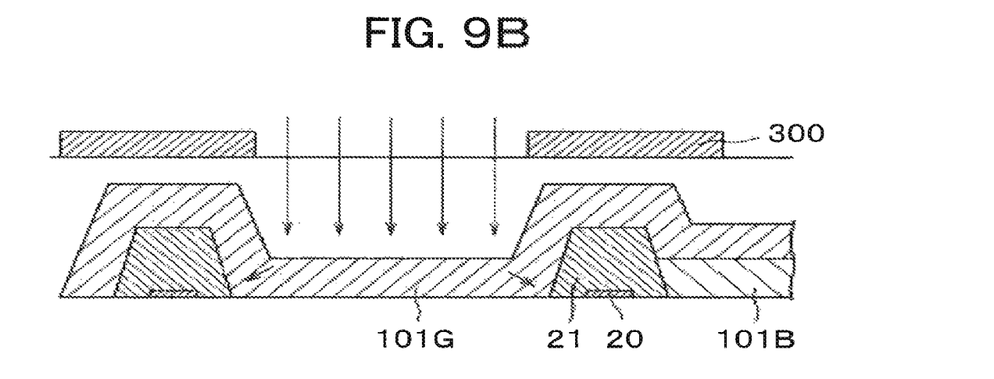
FIG. 9B is a process view where green resist is applied.
Figure 9C:
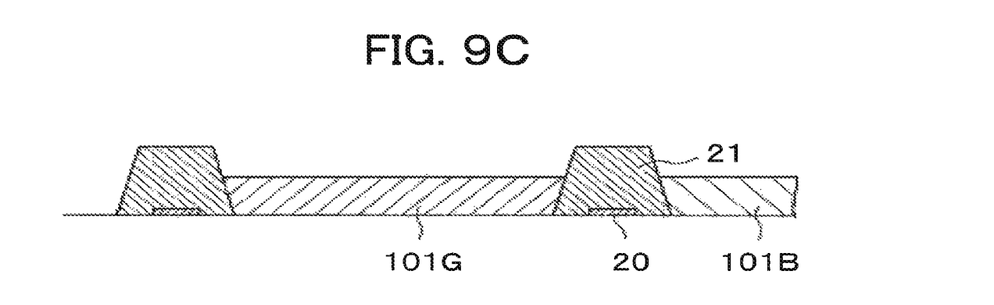
FIG. 9C is a process view where green resist is patterned.

FIG. 9 illustrates a process of forming the color filters 101R, 101G, and 101B, while forming the black matrix 21 having the thickness of the second embodiment. In a higher definition pixel, the patterning of the color filters becomes difficult. When the pattern is fine, the negative resist may be exfoliated or the size may be enlarged. This embodiment has an advantage in making a color filter stably.

As illustrated in FIG. 9A, before applying a color filter, the thick black matrix 21 is formed. This is used as a shielding body for separating the color filter. FIG. 9A illustrates a state where after a video signal line 20 and a black matrix 21 are formed into a stack body as the black matrix, a blue resist 101 is patterned.

Then, as illustrated in FIG. 9B, a green resist is applied there according to a slit coater. This is exposed with a mask applied there. Since it is the negative resist, a portion exposed to the light is hardened; here, the mask pattern should be a little smaller than the space between the shielding bodies 21. According to the scattering within the resist, the resist up to the shielding body is hardened to some degree, satisfactorily, and even when the mask alignment deviation is about 1.5 µm, the resist on the side of the wall does not have to be hardened too much. According to this, as illustrated in FIG. 9C, the green resist 101G is patterned. The red resist 101R is formed similarly.

Third Embodiment

Figure 10:
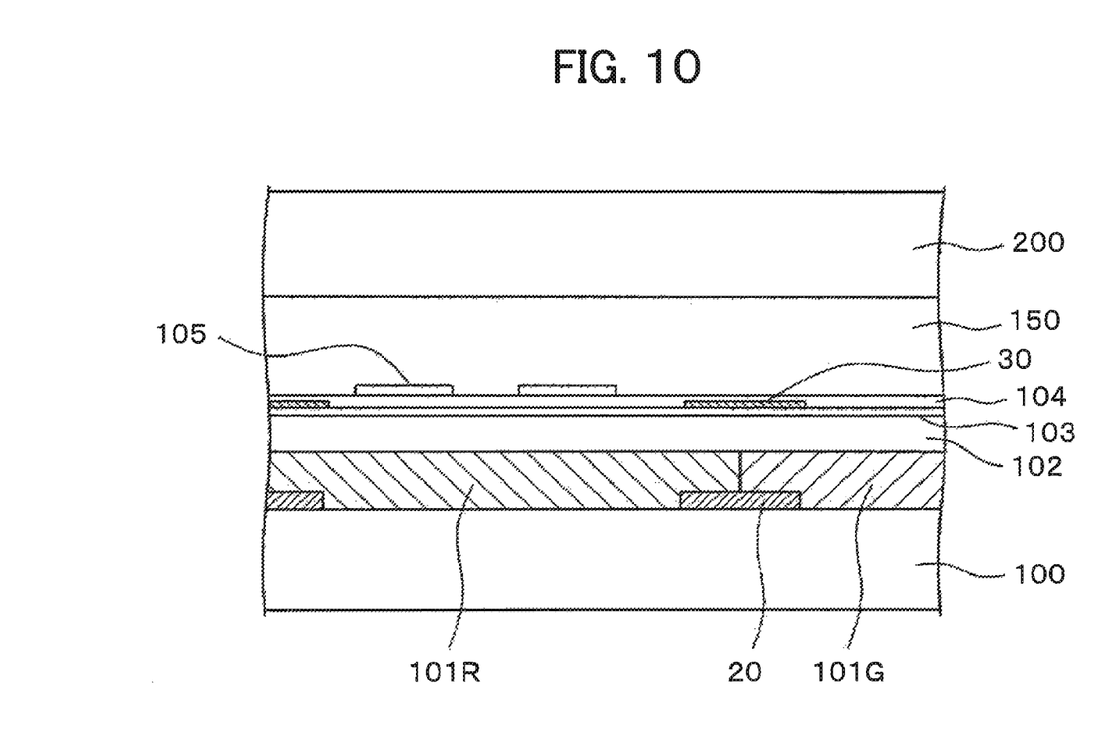
FIG. 10 is a cross-sectional view of a third embodiment.

In order to avoid a voltage drop in a common electrode formed by ITO, a metal wiring 30 can be arranged on the common electrode to reduce a resistance. FIG. 10 is a cross-sectional view illustrating the structure in the case where the lower layer ITO 103 is the common electrode and the metal wiring 30 is superimposed on the common electrode 103. An interlayer insulating film 104 is formed to cover the lower layer ITO 103 and the metal wiring 30. The other components of FIG. 10 are the same as those of FIG. 1.

In FIG. 10, the video signal line 20 takes a role of the black matrix. In a plan view, the metal wiring 30 for reducing a resistance of the common electrode is formed at the same position of the video signal line 20. The metal wiring 30 has a high shielding property and can serve as the black matrix.

By making the black matrix in a double layer structure as illustrated in FIG. 10, the degree of the color mixture can be reduced. In FIG. 10, the metal wiring 30 is formed on the lower layer ITO 103; however, when the upper layer ITO 105 is the common electrode, it is effective in forming the metal wiring also in the upper layer ITO 105.

Fourth Embodiment

Figure 11:
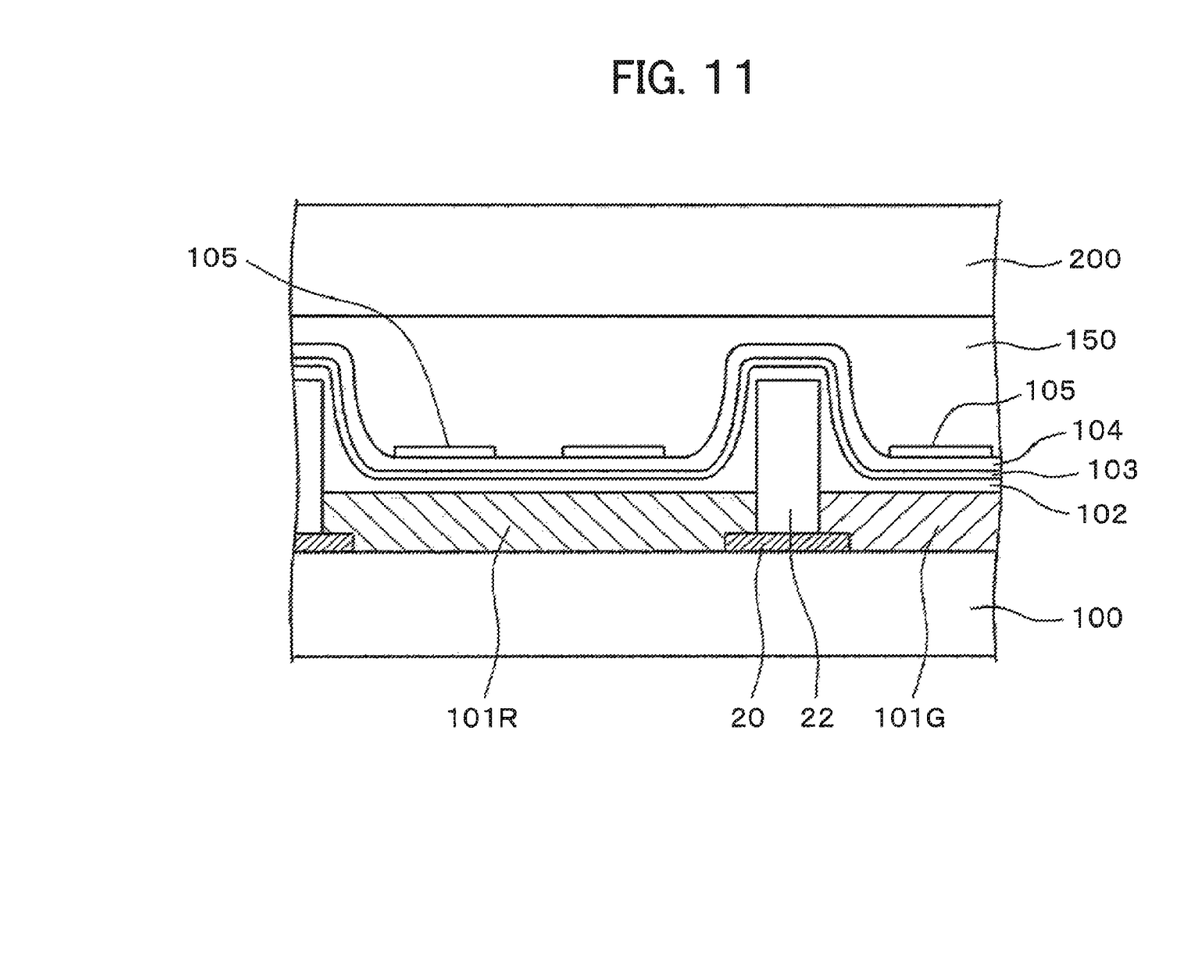
FIG. 11 is a cross-sectional view illustrating a fourth embodiment.

Even a transparent resin can realize a resin layer for forming the black matrix. FIG. 11 is a cross-sectional view illustrating this embodiment. In the structure illustrated in FIG. 11, a transparent spacer 22 is used for the portion corresponding to the black matrix and the modulation of a liquid crystal can be reduced characteristically by thinning the liquid crystal layer 150 corresponding to the above portion.

The liquid crystal display device is formed by interposing a polarizing plate, and the intermediate media having double refraction make the color white. The transparent spacer 22 is a medium having no double refraction and by making the thickness of the liquid crystal on the wall shaped spacer less than the half of the thickness of the original liquid crystal layer 150, the spacer can be actually treated as black color. More preferably, by making the thickness of the liquid crystal layer in the spacer portion not more than 10% of the thickness of the liquid crystal layer in the pixel, it can be substantially complete black. Ideally, the height of the transparent spacer 22 should be equal to the thickness of the liquid crystal layer 150 and the transparent spacer does not include the liquid crystal layer preferably.

In the above embodiments, although the description has been made in the case of using a video signal line as a black matrix, by way of example, a scanning line can be used also as the black matrix similarly to the video signal line. In this case, a metal wiring for reducing a resistance of a common electrode in the third embodiment is arranged at the same position as the scanning line in a plan view, hence to enhance the role of the black matrix. However, even when the scanning line is used as the black matrix, when a color filter of the same color is formed in the vertical direction, there is no effect of the color mixture prevention.

What is claimed is:

1. A liquid crystal display device comprising:
an array substrate on which first signal lines are respectively extended in a first direction and aligned in a second direction, second signal lines are respectively extended in the second direction and aligned in the first direction, and pixels are respectively formed in areas surrounded by the first signal lines and the second signal lines, and
an opposite substrate arranged in a way of facing the array substrate through a liquid crystal layer,
wherein a color filter is formed on at least one pixel of the pixels of the array substrate, an overcoat film is formed on the color filter, a first transparent electrode is formed on the overcoat film, an interlayer insulating film is formed to cover the first transparent electrode, and a second transparent electrode with a slit is formed on the interlayer insulating film,
the second signal line is a light shielding film, and
when a distance between centers of the adjacent second signal lines separating at least one pixel of the pixels in the first direction is defined as w, and
a distance from the top of the second signal line to the bottom of the liquid crystal layer is defined as d,
an expression of $d \leq 0.3w$ is satisfied.

2. The device according to claim 1, wherein a relation between the w and the d satisfies an expression of $d \leq 0.15w$.

3. The device according to claim 1, wherein resolution of a display screen is 500 ppi and more.

4. The device according to claim 1, wherein the overcoat film is formed of resin with thickness in a range of 50% to 150% inclusive of thickness of the color filter.

5. The device according to claim 1, wherein the color filter and the second signal line working as the light shielding film are in contact with each other.

6. The device according to claim 1, wherein the overcoat film is an inorganic film.

7. The device according to claim 6, wherein the overcoat film is formed of SiN or SiO2.

8. The device according to claim 1, wherein the color filter is formed on at least one pixel of the pixels in an island shape.

9. The device according to claim 8,
a through hole connecting a TFT and either one of the first transparent electrode or the second transparent electrode,
wherein the color filter doesn't cover the through hole.

10. The device according to claim 9, wherein the first transparent electrode is a pixel electrode.

11. The device according to claim 8,
a first through hole connecting the second signal line and a semiconductor of a TFT, a second through hole connecting the semiconductor of the TFT and a contact electrode, a third through hole connecting the contact electrode and either one of the first transparent electrode or the second transparent electrode,
wherein the color filter doesn't cover the third through hole.

12. The device according to claim 11, wherein the first transparent electrode is a pixel electrode.

13. The device according to claim 1,
a through hole connecting a TFT and either one of the first transparent electrode or the second transparent electrode,
wherein the color filter doesn't cover the through hole.

14. The device according to claim 13, wherein the first transparent electrode is a pixel electrode.

15. The device according to claim 1,
a first through hole connecting the second signal line and a semiconductor of a TFT, a second through hole connecting the semiconductor of the TFT and a contact electrode, a third through hole connecting the contact electrode and either one of the first transparent electrode or the second transparent electrode,
wherein the color filter doesn't cover the third through hole.

16. The device according to claim 15, wherein the first transparent electrode is a pixel electrode.

17. A liquid crystal display device comprising:
an array substrate on which first signal lines are respectively extended in a first direction and aligned in a second direction, second signal lines are respectively extended in the second direction and aligned in the first direction, and pixels are respectively formed in areas surrounded by the first signal lines and the second signal lines, and an opposite substrate arranged in a way of facing the array substrate through a liquid crystal layer,
wherein a color filter is formed on at least one pixel of the pixels of the array substrate, a first transparent electrode is formed on the color filter, an interlayer insulating film is formed to cover the first transparent electrode, and a second transparent electrode with a slit is formed on the interlayer insulating film,
the second signal line is a light shielding film, and
when a distance between centers of the adjacent second signal lines separating at least one pixel of the pixels in the first direction is defined as w, and
a distance from an upper boundary of the second signal line to a lower boundary of the liquid crystal layer is defined as d,
an expression of $d \leq 0.3w$ is satisfied.

18. The device according to claim 17, wherein a relation between the w and the d satisfies an expression of $d \leq 0.15w$.

19. The device according to claim 17,
a through hole connecting a TFT and either one of the first transparent electrode or the second transparent electrode,
wherein the color filter doesn't cover the through hole.

20. The device according to claim 19, wherein the first transparent electrode is a pixel electrode.

* * * * *